UNITED STATES PATENT OFFICE.

THOMAS McLEOD CLARK, OF OTTAWA, ONTARIO, CANADA.

IMPROVEMENT IN BRICKS.

Specification forming part of Letters Patent No. 184,757, dated November 28, 1876; application filed October 3, 1876.

*To all whom it may concern:*

Be it known that I, THOMAS MCLEOD CLARK, of Ottawa, in the county of Carleton, Province of Ontario, Dominion of Canada, have invented certain Improvements in Bricks, of which the following is a specification:

The object of my invention is to produce white or light-colored brick from those clays which, in a natural state, burn or bake of a red or other dark color; and to this end the invention consists in combining with the clay a suitable proportion of shell-marl, the effect of which is to deoxidize and bleach the clay, and render the same of a white or light color when burned.

My improvement may be used in the manufacture of white, pink, cream-colored, and mottled brick, of blocks, sills, mullion-pieces, straight cornices, arch-bands, key-blocks, and other plain and ornamental objects for architectural uses, and generally for all articles and objects which are to be used as substitutes for stone, brick, or pottery-ware.

The essential feature of the invention is the combination for the uses named, and other similar uses, of shell-marl and aluminous earth or clay, the manner of treating the materials being of secondary importance, and susceptible of modification, according to the requirements of the different cases.

The clay and marl may be taken directly from their natural beds, crushed or ground, either separately or together, thoroughly mixed, and incorporated into a homogeneous mass, tempered with water, with or without the addition of sand, and then molded in the usual manner, either by hand or in a machine; or the crushed materials may be passed through a washing-mill or other washing apparatus, and then passed through a screen or graded series of screens into shallow vats or pits, the screens being used to remove uncrushed shells and other coarse materials. The solid matter precipitates to the bottom of the vats or pits, and is there dried, either by the natural evaporation of the water, the application of artificial heat, atmospheric pressure, or exhaustion, or the water run off by percolation or by a system of spouts, which should be arranged to conduct it back to the wash-mill. When the precipitated material is sufficiently dried, or reaches the proper consistency, it is taken from the vats and molded, and then baked or burned, as usual.

The clay is brought to the best condition for the above treatment by running it out from the bank or bed in thin layers, and subjecting it to the action of winter frosts, or to the scorching rays of the summer sun, either treatment serving to break up and disintegrate the mass, and cause it to absorb water with readiness.

Another method of carrying out my invention is to place the clay, previously weathered as above, in a layer of from six to twelve inches in depth in a shallow pit, and then flood it with the water from a wash-mill containing the proper amount of the crushed and screened marl. In a day or two the water percolates through the clay and is drawn off, leaving the marl on top. The clay and marl are then thoroughly tempered and mixed, and the molding performed in the usual manner.

As before stated, the manner of preparing and combining the clay and marl may be varied, as circumstances may require or render expedient, the only requirement being that the materials shall be thoroughly and evenly incorporated with each other.

It will of course be understood that in all cases the proportion of clay must so far exceed that of the marl as to give the brick the proper strength and hardness in order that it may resist the crushing force to which it is subjected when used.

I am aware that it has been proposed to employ, in the manufacture of hydraulic cement, English marl or green sand having a very small proportion of clay; but my invention is in no wise affected thereby, the properties and qualities required in brick and in cement being widely different from each other.

Having thus described my invention, what I claim is—

1. As a new article of manufacture, a brick or similar article composed of aluminous clay and marl.

2. As an improvement in the art of manufacturing brick and similar articles from dark clay, the combination with the clay of finely-pulverized marl, for the purpose of bleaching the same and rendering the brick or other articles of a white or light color.

THOMAS McLEOD CLARK.

Witnesses:
P. T. DODGE,
WILL W. DODGE.